United States Patent [19]
McGreen

[11] Patent Number: 5,491,390
[45] Date of Patent: Feb. 13, 1996

[54] ELECTRIC PROPULSION SYSTEM FOR A BICYCLE

[76] Inventor: James R. McGreen, 1617 Willow St., Alameda, Calif. 94501

[21] Appl. No.: 181,780

[22] Filed: Jan. 18, 1994

[51] Int. Cl.$^6$ .................................................. B62D 3/00
[52] U.S. Cl. .................................. 318/5; 318/45; 180/221
[58] Field of Search ............................... 318/3, 5, 45, 49, 318/83, 111, 112, 113; 180/65.2, 220, 221, 200, 201

[56] References Cited

U.S. PATENT DOCUMENTS

| | | |
|---|---|---|
| 3,841,428 | 10/1974 | Bialek . |
| 3,938,013 | 2/1976 | Seilly et al. .......................... 318/111 X |
| 3,961,678 | 6/1976 | Hirano et al. . |
| 3,978,936 | 9/1976 | Schwartz .................................... 180/31 |
| 4,549,119 | 10/1985 | Slagle ........................................ 318/111 |
| 4,579,188 | 4/1986 | Facer ..................................... 180/221 X |
| 5,078,227 | 1/1992 | Becker ...................................... 180/221 |
| 5,316,101 | 5/1994 | Gannon ..................................... 180/221 |

*Primary Examiner*—Brian Sircus
*Attorney, Agent, or Firm*—Morgan, Lewis & Bockius

[57] ABSTRACT

An electric propulsion system for a bicycle includes one or two electric motors secured to a mounting assembly attached to the bicycle, a drive roller that impinges on the front wheel of the bike, a battery pack secured to the frame of the bicycle, and a motor controller device operated by the bicycle rider. The mounting assembly is secured to the bicycle steerer tube and includes a laterally extending pivot shaft that is generally parallel to the axle of the adjacent front wheel. A pair of pivot arms are secured to opposed ends of the pivot shaft. A pair of electric motors are disposed face-to-face with their shafts in coaxial alignment and joined by a drive roller. Lower ends of the pivot arms are secured to respective electric motors. A main brace extends between the motors and includes an upper end adjustably secured to the pivot arms, and the lower end is also joined the electric motors. A spring is interposed between the pivot shaft and its support to impart a restoring force and damping effect to the pivot arms and the motors. Frictional engagement of the drive roller on the front tire is automatically increased by torque generated by the drive roller engaging the front wheel. A battery pack is secured to the front crossbar of the bicycle, and is connected through switches and a control system to the motors. The motors may be connected to the battery in series or parallel, or one at a time, and a timer in the control circuit switches from one motor to the other to prevent motor overheating. A three position selector switch is provided on the handlebar to control the relays and select the power output combination of the motors, and a momentary contact power switch is also secured to the handlebar to permit the rider to actuate the motors.

53 Claims, 9 Drawing Sheets

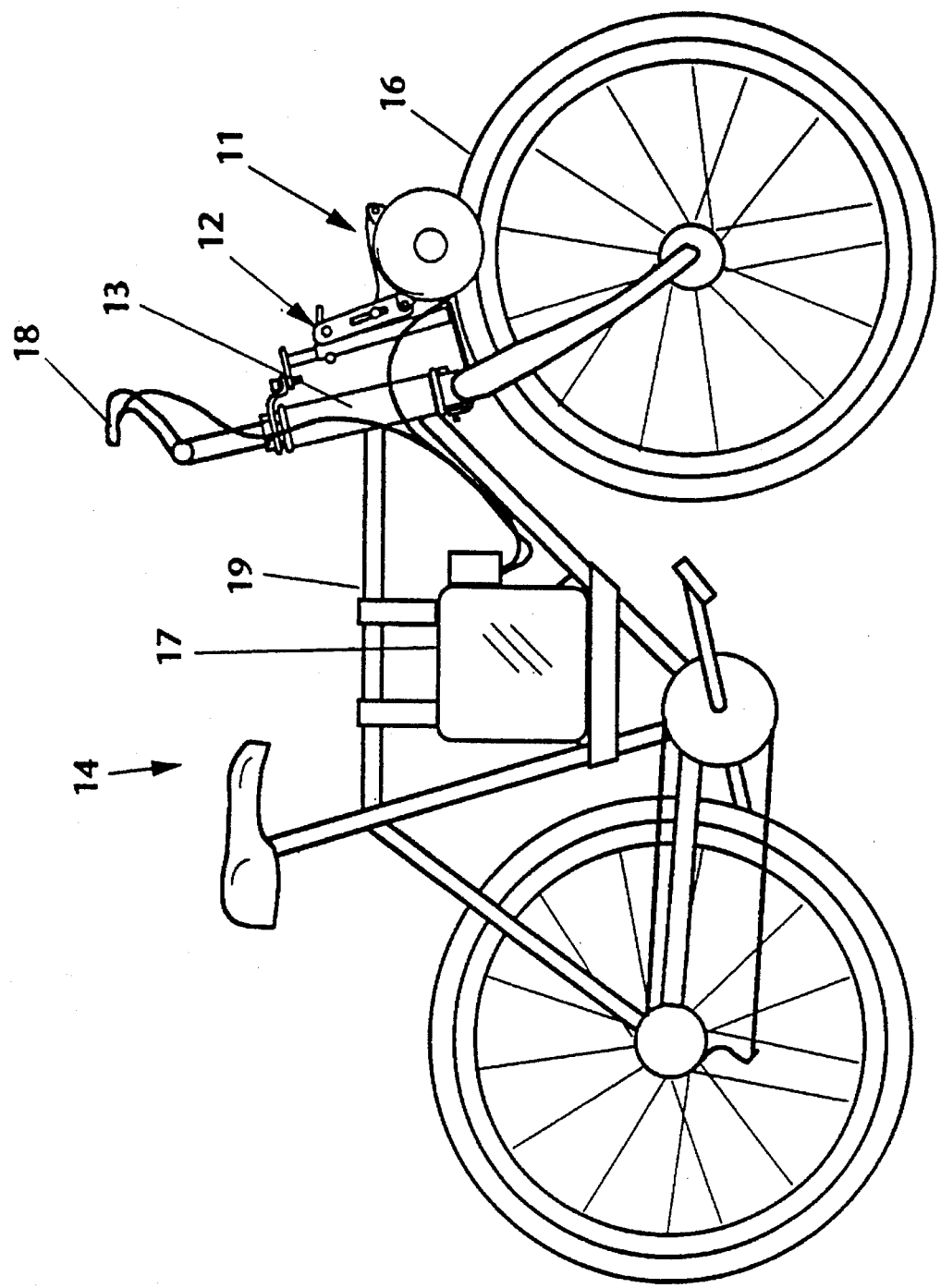
Figure_1

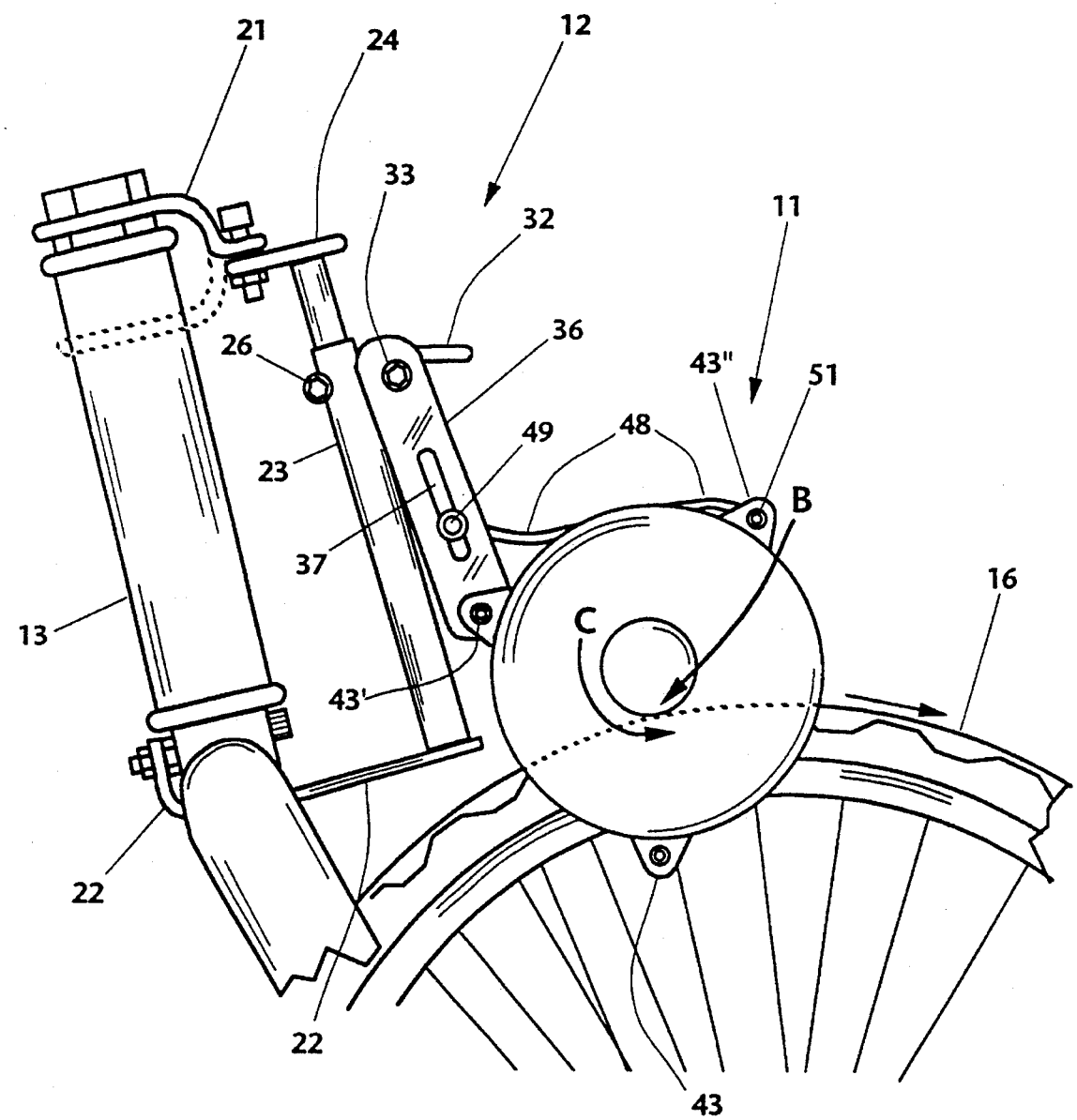
Figure_2

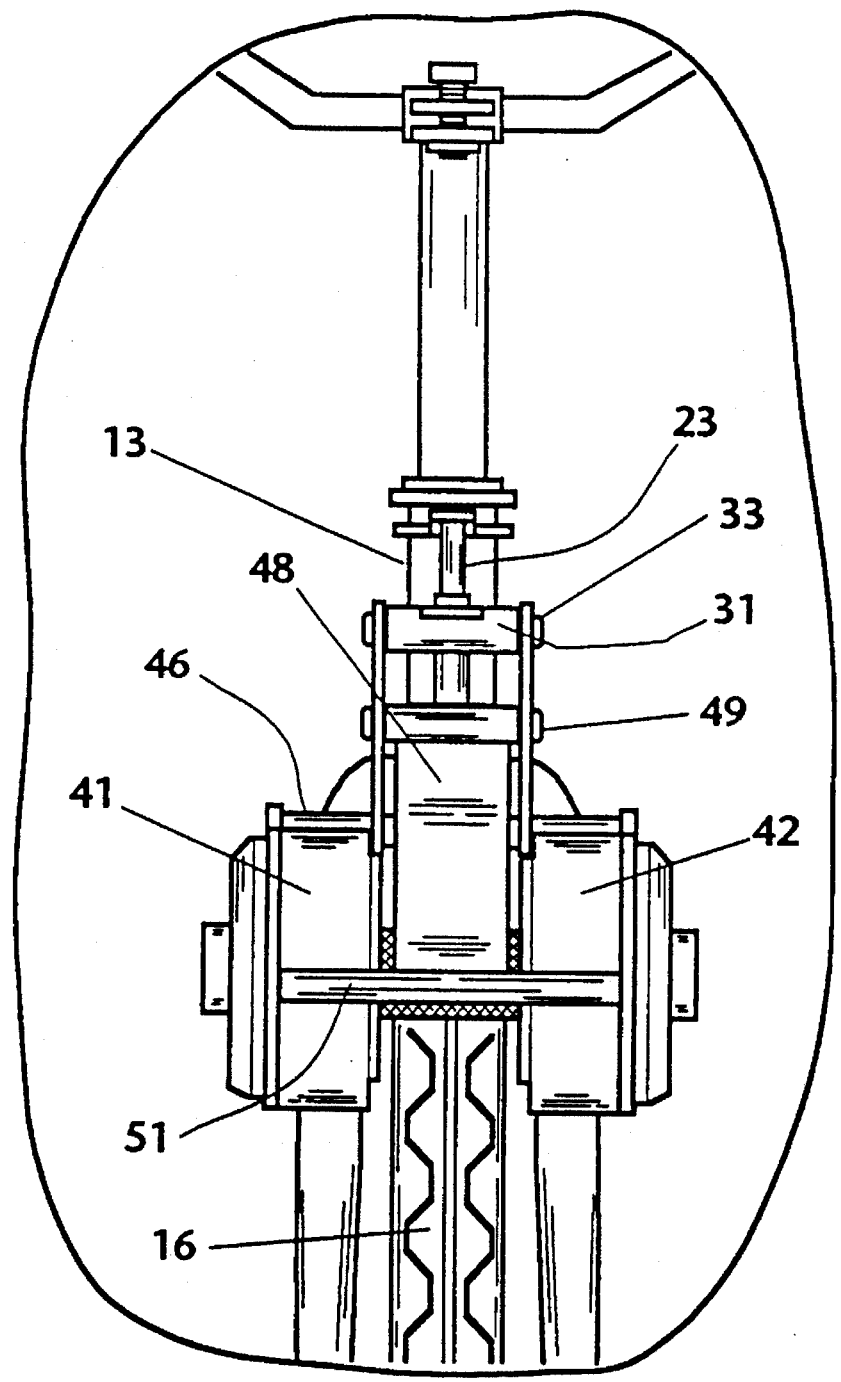
Figure_3

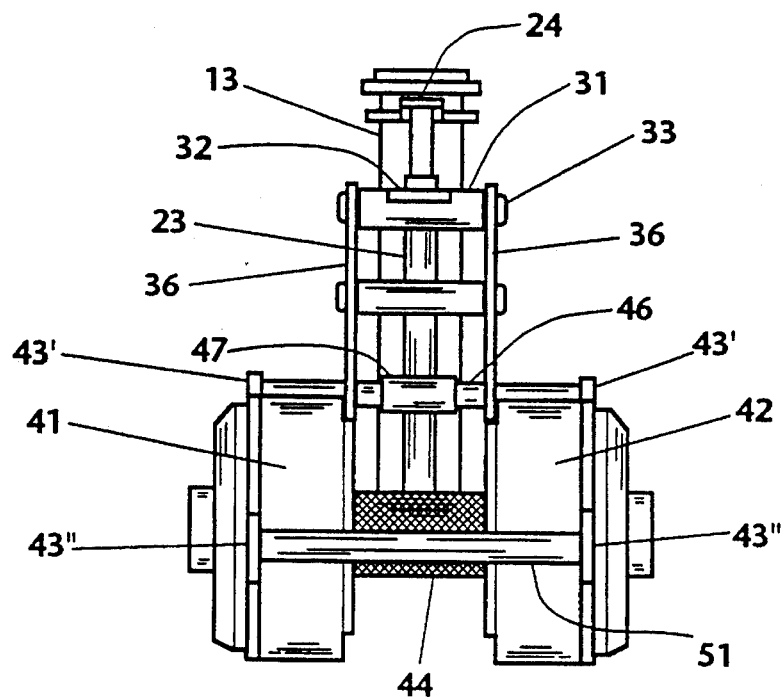
Figure_4
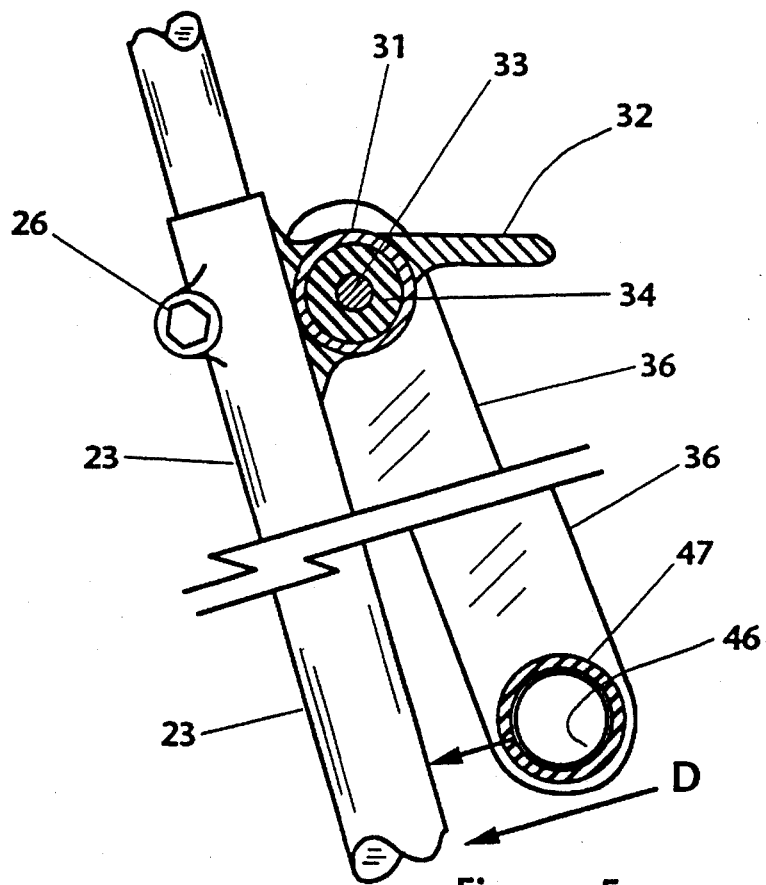
Figure_5

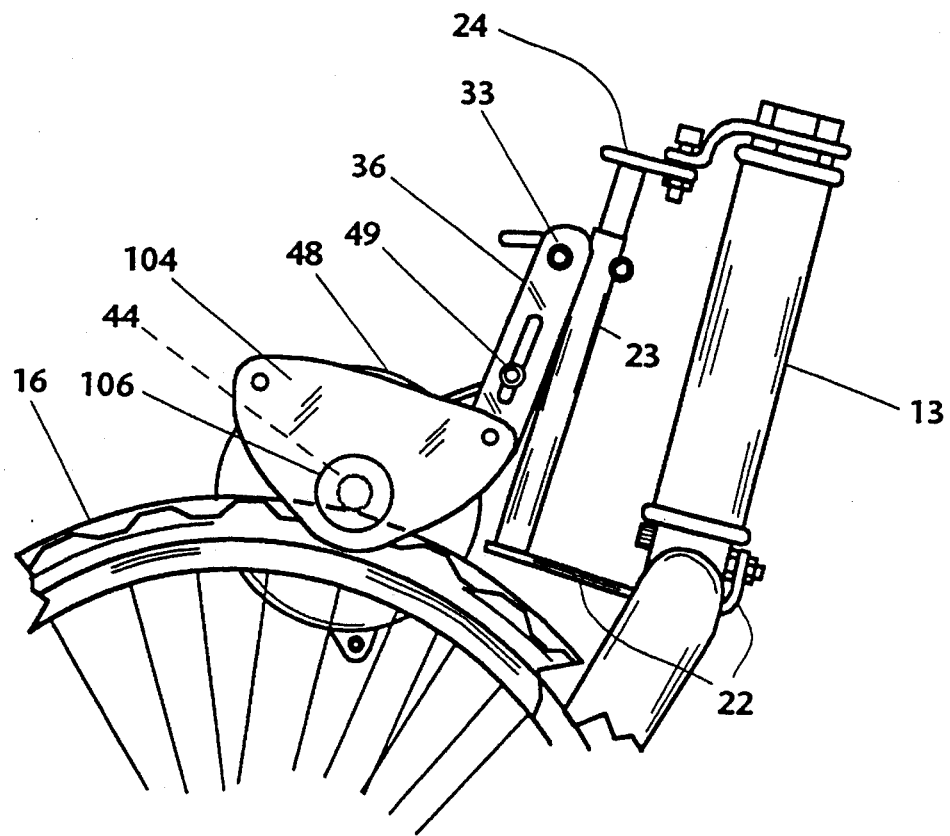
Figure_6
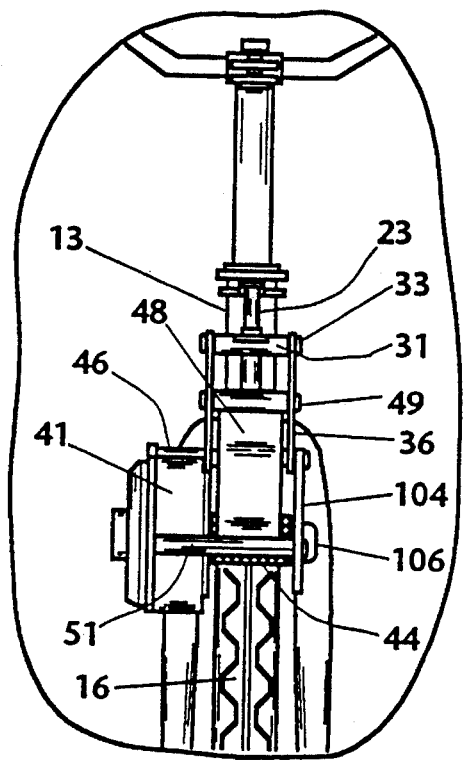
Figure_16

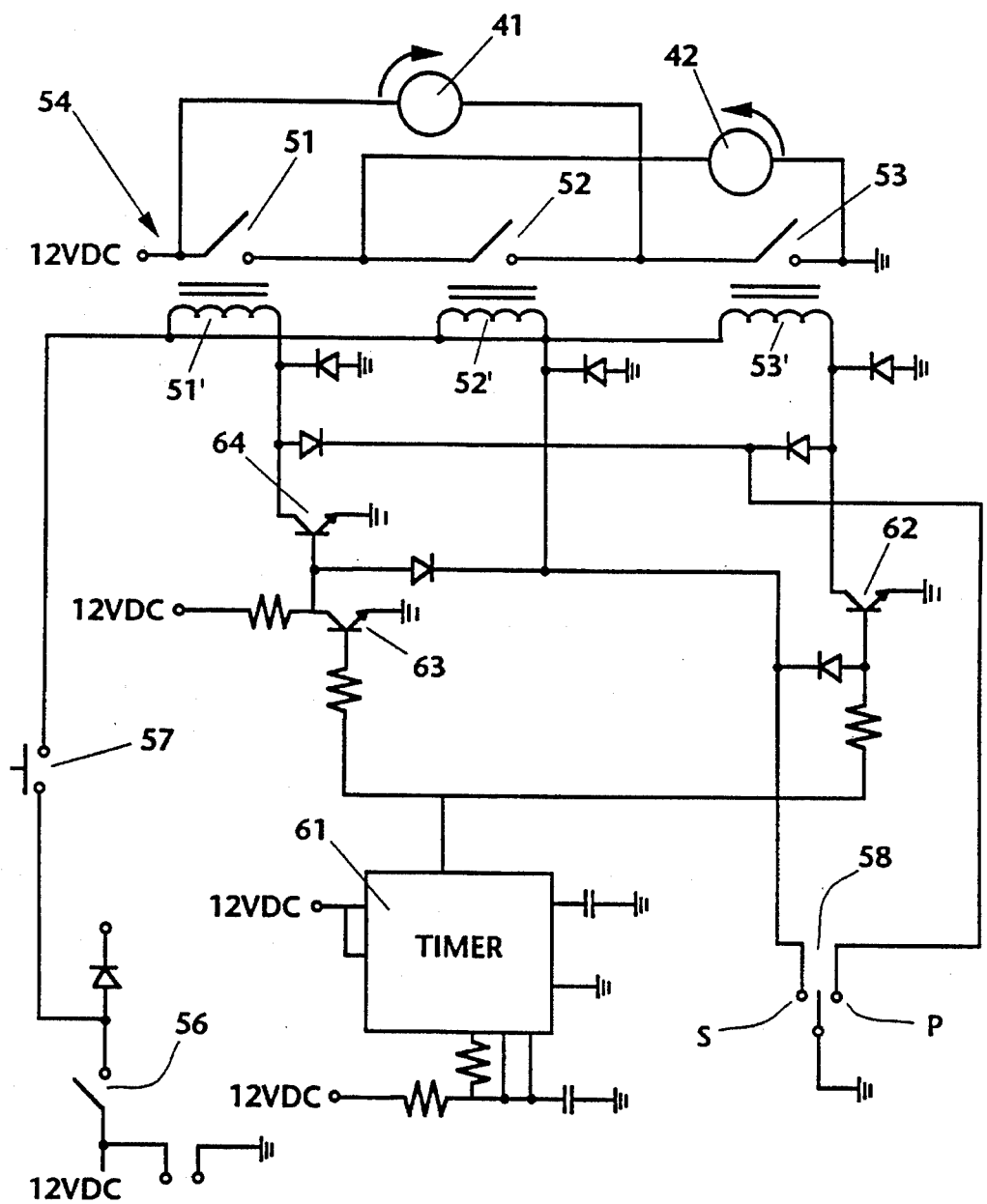
Figure_7

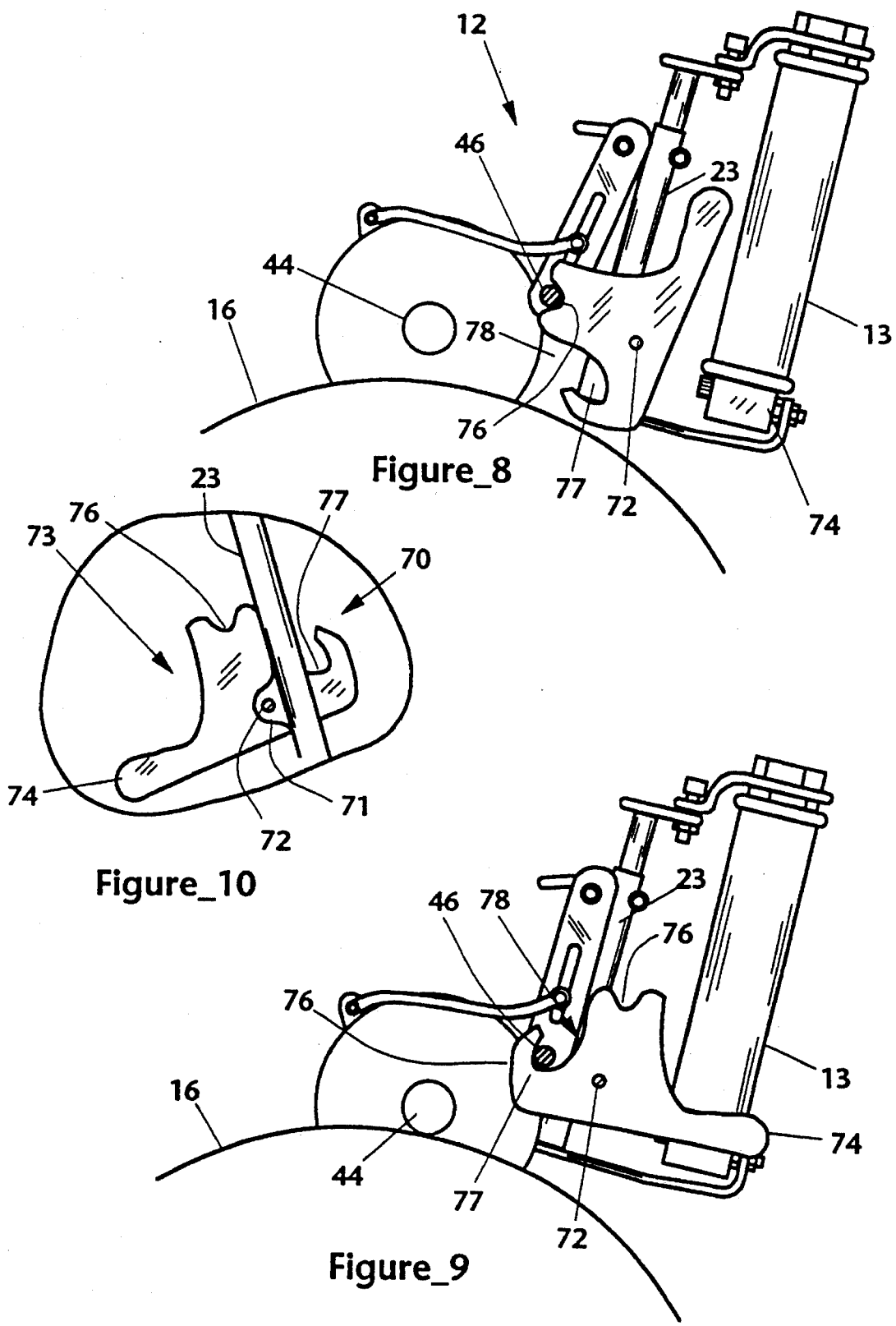

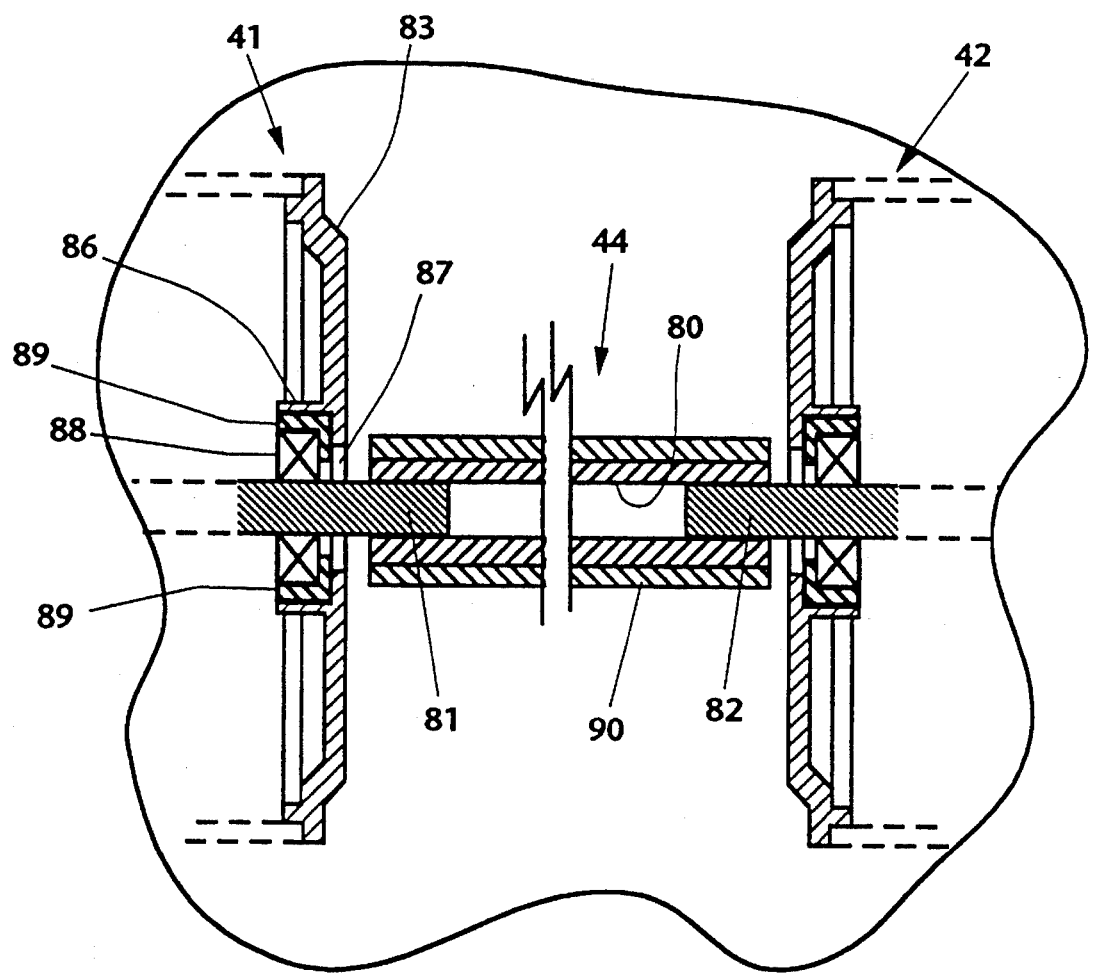
Figure_11

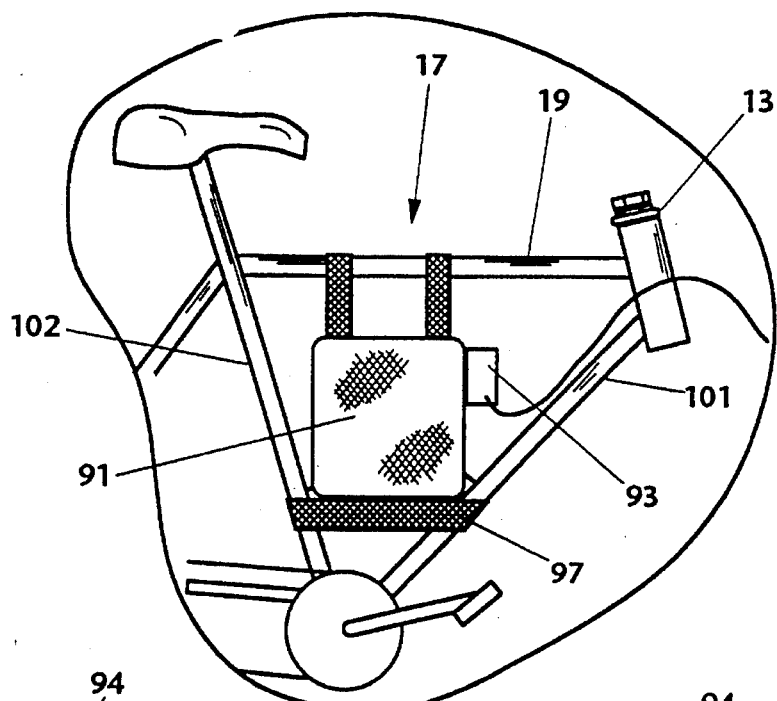
Figure_12
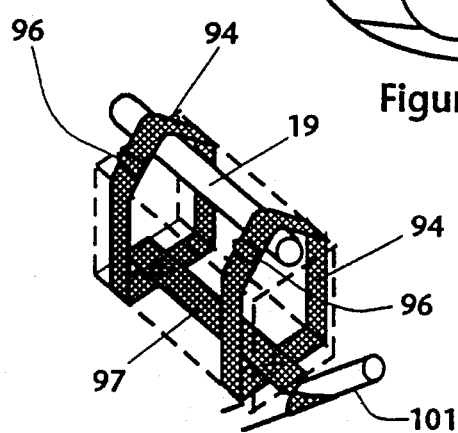
Figure_13
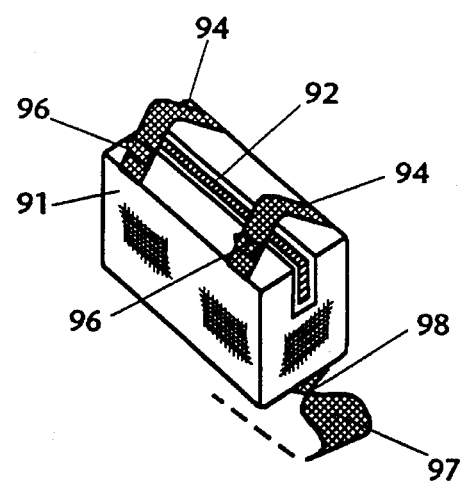
Figure_15
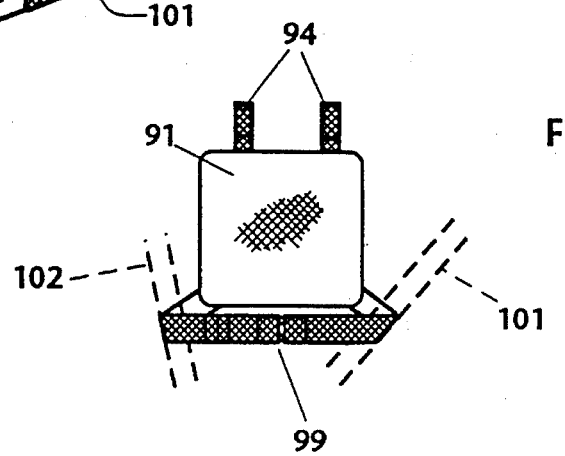
Figure_14

ELECTRIC PROPULSION SYSTEM FOR A BICYCLE

BACKGROUND OF THE INVENTION

In the past century bicycle design has undergone tremendous development and advancement, from a cumbersome, slow, heavy conveyance of limited use and range to a sleek, sturdy, lightweight vehicle that is adaptable to a great many uses. Although the advances in bicycle design, such as improved geometry, superior tires, and lighter, stronger tubing frames, have enabled a far larger segment of the public to enjoy and utilize bicycles for recreation, there remains a larger proportion of the public that cannot or will not ride bicycles.

Bicycles require a significant energy input from the rider to achieve locomotion for any meaningful distance, and this requirement is magnified substantially if hills must be negotiated. Many individuals do not wish to exert themselves to the extent required to make the bicycle a practical means of travel. In addition, senior citizens, individuals with medical conditions that limit exertion, and others are well advised to avoid such exertion. Thus the bicycle has been limited in utilization to those having healthy, if not robust, constitutions.

In recent years the bicycle has been promoted as an alternative means of travel for commuters, one that causes no air pollution nor consumes nonrenewable petroleum resources. Unfortunately, as a practical matter the exertion required for self-locomotion by bicycle often results in perspiration and fatigue, rendering an individual less than fit for a day's work. Thus most commuters have not responded favorably to imprecations to forsake their automobile for a bicycle.

Of course, there are a large variety of motorbikes and motorcycles known in the prior art and commercially available, but these conveyances generally are based on an internal combustion, gasoline powered engine. Several manufacturers also make available small internal combustion engine kits that can be installed on existing bicycles to augment the pedaling effort of the bicycle rider. Although all of these two wheel conveyances are more energy efficient than automobiles, they are still noisy, their exhaust is usually more rife with air pollutants than the highly regulated automobile engine, and they require frequent service. Thus the motorcycle, motorbike, and motor-assisted bicycle have failed to attract a significant portion of the public that would otherwise be eager bicycle riders and users.

SUMMARY OF THE PRESENT INVENTION

The present invention generally comprises an assembly for applying an electric motor assist to new or existing bicycles, tricycles, and scooters. The assembly includes one or two electric motors secured to a mounting assembly attached to a bicycle, a drive roller that impinges on the front wheel of the bike, a battery pack secured to the frame of the bicycle, and a motor controller device operated by the bicycle rider. The assembly may be provided as a kit for addition to existing bicycles, or may be incorporated in a new bicycle construction.

In one embodiment of the invention, the mounting assembly includes upper and lower brackets secured to upper and lower ends of the bicycle steerer tube and extending forwardly therefrom. A telescoped support extends between the upper and lower brackets generally parallel to the head tube, and supports a laterally extending pivot shaft that is generally parallel to the axle of the adjacent front wheel. A pair of pivot arms are pivotally secured at like upper ends to opposed ends of the pivot shaft. A pair of electric motors are disposed face-to-face with their shafts in coaxial alignment, and a drive roller is joined to both output shafts and disposed between the two motors. Each motor includes a generally cylindrical housing having a plurality of mounting lugs, and the lower ends of the pivot arms are secured by a first lateral rod to a first pair of laterally opposed lugs of the respective electric motors. The pivot arms each include aligned slots formed therein. A main brace includes an upper end secured to a adjusting shaft that is translatably received in the aligned slots of the pivot arms. The lower end of the main brace is joined by a second lateral rod to a second pair of aligned lugs of the electric motors.

The selective placement of the main brace in the slots of the pivot arms permits the assembly to be adjusted for variations in bicycle size and geometry, and the adjusting shaft is thenceforth fixedly secured in the slots. A torsional spring and damper are interposed between the pivot shaft and its support to exert a resilient restoring force and damping action on the pivot arms and the motors supported thereby, so that any oscillations of the motor pivot assembly are attenuated. The torsional spring is preferably an elastomeric bushing secured to both the pivot shaft and a cylindrical housing thereabout, the bushing providing both damping as well as a resilient restoring force. The drive roller engagement with the tire creates a reaction force that further pivots the motor mounting assembly toward the tire, so that frictional engagement of the drive roller on the tire increases automatically as torque increases A bumper is secured to a medial portion of the first lateral rod to limit the pivotal motion of the mounting assembly toward the telescoping support, thereby limiting pivoting motion of the drive roller toward the tire and preventing over-engagement of the drive roller with the tire.

A battery pack is secured to the frame top tube or other structural member of the bicycle, and is connected through switches and a control system to the motors. The control system includes relays or other power switching devices connected to the switches, so that the motors may be connected to the battery in series or parallel. The motors may also be connected to the battery one at a time, and a timer in the control circuit automatically switches from one motor to the other reiteratively, so that the motors cannot overheat. A three position selector switch is provided on the handlebar to control the relays and select the power output combination of the motors, and a normally open power switch is also secured to the handlebar to permit the rider to actuate the motors.

The drive roller includes a tubular metal core, and an outer traction surface which may comprise a high strength fiber fabric (Kevlar™ or the like) wrapped about the core and saturated with a hardened resin or rubber compound. This composite exhibits both high resistance to wear and a sufficient coefficient of friction to engage the rubber tire and drive the front wheel. Other materials and composites for this purpose are known in the prior art.

In a further embodiment, the mounting assembly is modified to support one electric motor, and the drive roller is secured to the output shaft of the electric motor. The second electric motor is replaced by a trianguloid plate that is secured to the ends of the first and second lateral rods, and which in turn includes a journal to support the outer end of the electric motor output shaft. The motor control is replaced by a simplified circuit having an on-off switch which operates a relay to actuate the motor.

In either embodiment, the main brace, which comprises a formed metal member, covers the drive roller and the adjacent portions of the tire. The main brace thus serves as an effective fender, preventing dirt and water from spraying from the drive roller toward the bicycle rider.

BRIEF DESCRIPTION OF THE DRAWING

FIG. 1 is a side elevation of a bicycle incorporating the electrical propulsion system of the invention installed thereon.

FIG. 2 is an enlarged side elevation of the motor mounting assembly of the electrical propulsion system of the invention.

FIG. 3 is a front elevation of the motor mounting assembly installed on a typical bicycle.

FIG. 4 is a front view of the motor mounting assembly, shown with the main brace removed.

FIG. 5 is an enlarged, partially cross-sectioned side elevation of the pivot arm-telescoping rod portion of the motor mounting assembly.

FIG. 6 is an enlarged side elevation of a further embodiment of the motor mounting assembly, featuring a single electric motor.

FIG. 7 is a schematic circuit diagram of the electrical control system of the invention.

FIG. 8 is a side elevation of a further embodiment of the invention, featuring a latch lever for controlling the mounting assembly, and depicted with the latch lever disposed to prevent drive roller contact with the bicycle tire.

FIG. 9 is a side elevation of the embodiment depicted in FIG. 8, depicted with the latch lever disposed to secure the drive roller in engagement with the bicycle tire.

FIG. 10 is an enlarged, reverse side elevation depicting the mounting assembly for the latch lever depicted in FIGS. 8 and 9.

FIG. 11 is an enlarged cross-sectional view of the two motor mount bearing arrangement.

FIG. 12 is a side elevation of the battery pack of the invention supported on a bicycle.

FIG. 13 is a side elevation of the battery pack of the invention.

FIG. 14 is a skeletal perspective view of the support strap assembly of the battery pack.

FIG. 15 is an exterior perspective view of the battery pack depicted in FIGS. 12–14.

FIG. 16 is a front elevation of the single motor embodiment as also depicted in FIG. 6.

DESCRIPTION OF THE PREFERRED EMBODIMENT

The present invention generally comprises an electric propulsion system for use with new or existing bicycles. With regard to FIG. 1, the system generally includes an electric motor assembly 11 supported on a motor mounting assembly 12 that is secured to the steerer tube 13 of a typical bicycle 14. The motor assembly is adapted to engage the tire 16 to rotate the wheel and propel the bicycle forward. A battery unit 17 is suspended from the top tube 19 and tied to the bicycle frame for stability, and connected via electrical cables to the motor assembly 11 and operator controls secured to the handlebar 18. The placement of the battery unit medially with respect to the front and rear wheels distributes the weight and contributes to a stable ride, while the motor assembly 11 and mounting assembly 12 together weigh only a few pounds.

With regard to FIGS. 2–4, the motor mounting assembly 12 includes upper and lower brackets 21 and 22 secured to opposed ends of the steerer tube 13 and extending forwardly therefrom. A telescoping support 23 is fixedly secured at its lower end to the lower bracket 22, and includes a link 24 extending from the upper end to be bolted to the upper bracket 21. The upper and lower brackets are spaced apart in accordance with the length of the steerer tube 13, and the support 23 is telescoped to span the interbracket spacing and extend generally parallel to the steerer tube 13. A pinch bolt 26 secures the telescoping member between the upper and lower brackets. This construction permits the mounting assembly to be used with a wide range of bicycle sizes and geometries. The upper bracket 21 may also be inverted, as shown in dotted line, to accommodate short head tubes of small bicycles within the telescoping range of support 23.

With regard to FIGS. 3–5, a tubular housing 31 is secured to the telescoping support 23, extending generally transversely to the axes of the support 23 and the steerer tube 13. A headlight support 32 projects forwardly from a central portion of the housing 31 to support an optional headlight. An elastomeric bushing 34 extends through the tubular housing 31, and supports a coaxial pivot shaft 33. The bushing 34 is secured to both the tubular housing 31 and the shaft 33, and acts as a damped torsional spring which applies a resilient restoring force to the shaft 33, as shown in FIG. 2. A pair of pivot arms 36 are secured to opposed ends of the pivot shaft 33 and extend parallel to each other and generally downwardly from the pivot shaft. Each pivot arm is provided with a slot 37 extending longitudinally in a medial portion thereof.

The motor assembly 11, shown particularly in FIGS. 2–4, includes a pair of identical electric motors 41 and 42. The cylindrical housings of the motors are each provided with a plurality of mounting lugs 43. The motors are disposed in face-to-face relationship with the outputs shafts in confronting, coaxial relationship, and a drive roller 44 joins both the output shafts to combine the outputs of the motors 41 and 42. The drive roller is provided with an outer frictional surface adapted to engage the tire 16 of the front wheel of the bicycle.

A first lateral support rod 46 extends through aligned holes in the lower ends of the pivot arms 36, and is joined to opposed mounting lugs 43' of motors 41 and 42. A tubular bumper 47 is secured to a medial portion of the support rod 46 to engage the telescoping support 23, as will be explained in the following description. A main brace 48 includes an upper end secured to a adjusting shaft 49 that is translatably received in the aligned slots 37 of the pivot arms 36. The lower end of the main brace is joined by a second lateral rod 51 to a second pair of aligned lugs 43" of the electric motors 41 and 42. The selective placement of the main brace along the slots 37 of the pivot arms permits the assembly to be adjusted for variations in bicycle size and geometry, and the adjusting shaft 49 is thenceforth fixedly secured in the slots 37.

The main brace 48 may comprise a member formed of rigid sheet metal and spanning most of the space between the motors 41 and 42. The main brace thus forms an effective fender which covers the area in which the drive roller 44 engages the tire 16, and blocks any dirt or spray from the drive roller from reaching the bicycle rider. As an alternative construction, the main brace may include formed lateral tubular portions at the upper and lower ends thereof; the first lateral pivot rod may be replaced by screws extending through the slots 37 to the upper tubular portion of the brace, and the second lateral pivot rod may be replaced by screws extending from the motor lugs 43" to the lower tubular portion of the brace.

It is significant that the motors 41 and 42 are rigidly joined to the main brace 48 and the pivot arms 36, forming a unit that pivots about the shaft 33. The torque C of the motor units creates a reaction force in the rotational direction B to cause impingement of the drive roller 44 on the tire 16. When the motors are actuated to propel the bicycle, the torque C applied by the drive roller 44 urges the pivot arms 36 to rotate in direction D (FIG. 5), further urging the drive roller 44 into greater impingement with the front tire. Thus the frictional engagement of the drive roller is increased automatically in correspondence to the torque generated by the drive roller, due to the geometry and design of the mounting assembly. Conversely, the drive roller rides lightly on the tire when the motors are not actuated, so that the bicycle may glide and freewheel efficiently. The bumper 47 limits the extent of the pivoting movement of the motor mounting assembly, and prevents over-engagement of the drive roller with the tire.

The drive roller preferably includes a tubular metal core, and an outer frictional surface. One frictional surface material is a laminate assembly comprised of a high strength fiber fabric (Kevlar™ or the like) wrapped about the core and saturated with a hardened resin or rubber compound. This composite exhibits both high resistance to wear and a sufficient coefficient of friction to engage the front tire and drive the front wheel.

With regard to FIG. 7, the electronic motor control system includes a power circuit 54 comprised of relay switches 51, 52, and 53 connected between positive battery voltage and ground. Motor 41 is connected from the positive battery terminal to a point between relay switches 52 and 53, and motor 42 is connected from ground to a point between relay switches 51 and 52. The respective relays 51', 52', and 53' are connected in parallel from the positive battery terminal through a main on-off switch 56 and a momentary contact switch 57. The ground for relay 52 is connected to one pole S of selector switch 58, a SPDT on-off-on switch having an open neutral position. The ground connections for relays 51 and 53 are connected to the other pole P of switch 58.

With the main switch 56 closed and the momentary switch 57 closed, closure of switch 58 to pole S causes relay 52 to close, thus connecting motors 41 and 42 in series and propelling the bicycle at moderate speed. With the main switch 56 closed and the momentary switch 57 closed, closure of switch 58 to pole P causes relays 51 and 53 to close, thus connecting motors 41 and 42 in parallel and propelling the bicycle at higher speed. With switch 58 in the neutral position, there is no ground path for the relays through switch 58.

The control system also includes a timer module 61, such as a 555 chip known in the prior art, which is configured by a resistor and capacitor network to generate an output in the range of 30 seconds to one minute. The timer output is connected to the base inputs of transistors 62 and 63, switching on both these transistors. The emitter-collector circuit of transistor 62 is connected between relay 53' and ground, so that when transistor 62 is switched on, motor 41 is connected in the power circuit 54 to propel the bicycle. Transistor 63 is connected in inverter fashion to the base of transistor 64, and the emitter-collector circuit of transistor 64 is connected between relay 51' and ground. Closing of relay 51' causes operation of motor 41. Thus actuation of transistor 63 turns off transistor 64, so that relay 51' is held off when relay 53' is closed, and relay 51' is closed when relay 53' is open. Therefore, when the switch 58 is placed in the neutral position and the main switch 56 is closed, closing the switch 57 will cause the motors 41 and 42 to operate alternately and equally, the period being determined by the timer 61. This mode of operation permits the power saving advantage of using only one motor to propel the bicycle, while overcoming the intrinsic problem of motor overheating when a single motor is used for an extended period of time. Thus the invention provides three speed selection produced by the two motors acting together in series or parallel, as well as alternating single motor operation.

It is noted that pole S of switch 58 is also connected through diodes to the base connections of transistors 62 and 63, so that grounding of pole S to operate relay 52 will automatically prevent operation of relays 51 and 53 by the timer 61. Thus these operating modes are mutually exclusive.

With regard to FIGS. 8–10, a further embodiment of the invention comprises an assembly 70 for controlling the motor mounting assembly 12. The assembly 70 includes a mounting lug 71 secured to a lower medial portion of the telescoping member 23, and a laterally extending shaft 72 is supported by the lug 71. A control lever 73 is pivotally secured to the shaft 72, and configured to engage the lateral rod 46 of the motor mounting assembly in differing aspects. The control lever 73 is a longitudinally extending member having a handle portion 74 at the rear end, and a socket-like recess 76 formed in a top edge portion thereof. The recess 76 is configured to engage the lateral rod 46 (FIG. 8), and the spacing of the recess 76 from the shaft 72 and the telescoping member 23 is selected so that the drive roller 44 is spaced away from the tire 16. The engagement of recess 76 and rod 46 assures that the bicycle may freewheel without impediment, and the motor assembly is completely disengaged from the tire 16.

The control lever further includes a latching slot 77 formed in an upper edge portion thereof and also disposed to engage the lateral rod 46, as depicted in FIG. 9. The latching slot 77 is configured to maintain engagement with the rod 46, and the spacing of the slot 77 from the shaft 72 and the telescoping member 23 is selected so that the drive roller 44 is locked into engagement with the tire 16. This aspect of the control lever permits operation of the motors 4 1 and 42 in regeneration mode, in which the motors are employed as generators during long downhill runs to act as brakes and to return energy to the battery. The control lever 73 further includes a recess 78 formed in the upper edge thereof and disposed between the slot 77 and the recess 76. When the lever is pivoted so that the recess 78 is confronting the lateral rod 46, the motor mounting assembly is free to function in the drive mode described previously (FIG. 2), in which the drive roller impinges resiliently on the tire 16 and drive torque increases the frictional impingement of the drive roller. Thus the lever 73 provides greater selectivity in operating the system and the bicycle.

With regard to FIG. 11, another embodiment of the invention concerns the coupling of the output shafts of the two motors 41 and 42. The motors includes shafts 81 and 82, respectively, which are secured in coaxial, confronting relationship within a core tube 80 of the drive roller assembly 44. An outer composite layer 90 is adhered to the outer surface of the tube 80 to provide a frictional surface to engage the bicycle tire. Thus the two shafts are secured together rigidly for rotation in common, contradicting the conventional engineering dictum that requires coupling two rotating machines with a flexible coupling to eliminate stress and instability due to inevitable axial misalignment.

Each motor includes a face plate 83 having a central aperture 87 through which the output shaft extends. Formed on the inner surface of the face plate and coaxially about the aperture 87 is a cylindrical bearing journal 86. A ball or needle bearing 88 is received about the shaft 81 and disposed within the journal 86. A significant aspect of the assembly is the provision of a bushing 89 interposed between the bearing 88 and the journal 86. The bushing comprises a cylindrical, cup-like structure formed of rubber or similar durable, elastomeric material, so that the bearing 88 may "float" or diverge slightly from a true coaxial position to accommodate vibration, misalignment, or other transient effects. The outer, opposite ends of the output shafts are preferably arranged similarly with their bearings supported in resilient bushings 88, so that both ends of each output shaft may adjust to axial misalignments and transient instabilities. (Both motors are essentially identical in construction and both include the structure enumerated herein and shown in FIG. 11.)

The battery unit 17, shown in detail in FIGS. 12–15, includes a bag 91 formed of fabric such as heavy duty Nylon™ or the like and dimensioned in rectangular format to enclose a battery; e.g., a sealed lead-acid gel cell having deep discharge and high amp-hour storage capacity. The bag includes a zipper closure 92 extending the length thereof to provide access to the battery terminals. Removably joined to the front surface of the bag 91 is a housing 93 to enclose the electronic circuitry shown in FIG. 7 and described previously. The bag 91 is reinforced by a pair of woven fabric straps 94, each extending in a loop that is secured within the sidewalls and bottom wall of the bag 91. The upper extent of each loop passes over the top tube 19 of the bicycle to provide primary support for the weight of the battery. Each strap 94 includes an adjustment buckle assembly 96 to release or tighten and loosen the strap. The straps 94 are preferably formed of woven polypropylene, which is highly resistant to damage from sulfuric acid in the unlikely event of accidental battery puncture.

A longitudinal strap 97 extends along the bottom wall of the bag 91, and is sewn to the straps 94 at each transverse intersection therewith. The ends of the strap 97 extend from the lower front and rear walls of the bag 91, and are each provided with a half-twist 98 before passing about the down tube 101 and the seat tube 102 of the bicycle frame. The ends of the strap 97 are then joined by an adjustable buckle assembly 99 extending laterally between the down tube and seat tube. Due to the upwardly diverging configuration of the seat tube and down tube (common to virtually all prior art bicycle geometries), tightening of the adjustment assembly 99 tends to pull down on the bag 91, in opposition to the straps 94 suspending the bag 91 from the crossbar 19. By tightening the adjustment assemblies 96 and 99, the bag 91 may be suspended under tension within the triangle defined by the crossbar, seat tube, and down tube. This arrangement provides great stability for level riding, turns, bumps, and hills, and the battery is supported in a position that does not interfere with the rider. Furthermore, the battery weight is centered with respect to the front and rear wheels to distribute the load optimally.

In a further embodiment of the invention, depicted in FIGS. 6 and 16, the bicycle is propelled by a single electric motor 41, and the motor 42 is eliminated. Although the motor mounting assembly is substantially unchanged, a triangular plate 104 is disposed in place of the motor 42, and secured to a foreshortened lateral rod 51 and to the lower end of the pivot arm 36 by a foreshortened lateral rod 46. The plate 104 includes a cup-like housing 106 which is a bearing journal for a bearing that supports one end of the drive roller 44. The bearing arrangement within the housing 106 includes a bearing 88 and resilient bushing 89 as described with reference to FIG. 11, so that the distal end of the drive roller 44 may "float" and accommodate irregularities and misalignment in the motor support assembly. The plate 104 is rigidly secured to the brace 48 by the rod 51 and to the pivot arm by rod 46, thereby providing a secure support for the bearing journal and the drive roller 44. The pivoting operation of the motor mounting assembly is unchanged from the previous description.

For the embodiment of FIGS. 6 and 16, the electronic controller described previously is replaced by a simple on-off switch operating a single relay to power the single motor 41 in series connection. The battery unit arrangement is substantially as described previously, so that the optimal weight distribution is preserved. Likewise, the control lever embodiment may also be included in the single motor embodiment, although it is not necessary.

It is noted that the invention has been described herein with reference to driving the front wheel of a bicycle. However, the system may be applied to a rear wheel of a bicycle with little modification. Also, the invention may be applied to tricycles and scooters for children and adults.

I claim:

1. An electric propulsion system for a bicycle, including:

a pair of electric motors having output shafts joined to a common drive roller;

motor mounting means for pivotally securing said pair of electric motors to a frame portion of the bicycle;

wherein a torque of said motors creates a reaction force to cause impingement of said drive roller on the tire, and wherein when the drive roller impinges on the tire, the torque of said motors further urges said drive roller into greater frictional engagement with the tire.

2. The bicycle propulsion system of claim 1, wherein said pair of electric motors are disposed in face-to-face relationship with respective output shafts in confronting, coaxial alignment.

3. The bicycle propulsion system of claim 2, wherein said motors are disposed to straddle the plane of the tire engaged by said drive roller.

4. The bicycle propulsion system of claim 1, wherein said motor mounting means includes a pair of mounting brackets secured to opposed ends of a steerer tube of the bicycle and including portions extending forwardly therefrom, and further including a first support extending in length-adjustable fashion between said pair of mounting brackets.

5. The bicycle propulsion system of claim 4, including a lateral pivot shaft, means for supporting said lateral pivot shaft on said first support, and a pair of pivot arms secured at opposed upper ends to said lateral pivot shaft, each of said pivot arms being secured at a lower end to one of said pair of electric motors.

6. The bicycle propulsion system of claim 5, wherein said means for supporting said lateral pivot shaft includes spring means for applying a restoring force and damping effect to said lateral pivot shaft.

7. The bicycle propulsion system of claim 6, further including a tubular shaft support extending laterally from said first member, said lateral pivot shaft extending through said tubular shaft support.

8. The bicycle propulsion system of claim 7, wherein said spring means is disposed concentrically within said tubular shaft support.

9. The bicycle propulsion system of claim 8, wherein said spring means includes an elastomeric bushing secured to both said lateral pivot shaft and said tubular shaft support.

10. The bicycle propulsion system of claim 5, further including a main brace having opposed first and second ends and extending laterally between said pair of motors, said main brace secured at said first end to both said electric motors, and further including means for adjustably securing said second end of said main brace to said pivot arms.

11. The bicycle propulsion system of claim 10, wherein said means for adjustably securing said second end of said main brace includes a pair of slots, each extending longitudinally in one of said pair of pivot arms, and an adjustment shaft secured to said second end of said main brace and extending through said pair of slots in adjustably positionable fashion.

12. The bicycle propulsion system of claim 10, wherein said brace extends laterally to span substantially the entire space between said pair of electric motors and to block spray emanating from said drive roller.

13. The bicycle propulsion system of claim 5, further including a first lateral support rod extending between said pair of electric motors and joined to opposed lower ends of said pivot arms.

14. The bicycle propulsion system of claim 1, further including control lever means for controlling the function of said motor means.

15. The bicycle propulsion system of claim 13, further including control lever means for controlling the function of said pivot means, wherein said control lever means includes a control lever pivotally secured to said first support, said control lever including edge portions for selectively engaging said first lateral support rod at different rotational dispositions of said control lever.

16. The bicycle propulsion system of claim 15, wherein said control lever includes a first edge portion for engaging said first lateral support rod and maintaining said motor mounting means with said drive roller spaced apart from the bicycle tire, whereby the bicycle may freewheel.

17. The bicycle propulsion system of claim 15 wherein said control lever includes a second edge portion formed as a latch detent and arranged for fixedly engaging said first lateral support rod and maintaining said motor mounting means with said drive roller frictionally engaged with the bicycle tire.

18. The bicycle propulsion system of claim 15, wherein said control lever includes a third edge portion disposed to disengage from said first lateral support rod and permit unfettered functioning of said motor mounting means.

19. The bicycle propulsion system of claim 1, wherein each of said electric motors includes an output shaft bearing disposed adjacent to said drive roller, a bearing journal for supporting said output shaft bearing, and further including resilient bushing means interposed between said bearing journal and said output shaft bearing to accommodate misalignment between said output shafts of said electric motors.

20. The bicycle propulsion system of claim 1, further including battery means for powering said motors, and control means for actuating said pair of motors selectively in electrical parallel connection and electrical series connection.

21. The bicycle propulsion system of claim 20, wherein said control means includes means for actuating said pair of motors individually and alternately each for a predetermined period of time.

22. The bicycle propulsion system of claim 1, further including battery means for powering said motors and suspension means for supporting said battery means in depending relationship from a crossbar of the bicycle.

23. The bicycle propulsion system of claim 22, wherein said suspension means includes a battery enclosure, at least one vertical webbing member extending from said battery enclosure about the bicycle top tube, and a lateral webbing member extending from said battery enclosure and circumscribing a down tube and seat tube of the bicycle.

24. The bicycle propulsion system of claim 23, further including a pair of vertical webbing members, said vertical webbing members extending into said battery enclosure and circumscribing a battery disposed therein.

25. The bicycle propulsion system of claim 24, wherein said lateral webbing member extends through said battery enclosure adjacent to a bottom wall panel thereof.

26. The bicycle propulsion system of claim 23, wherein said battery enclosure comprises a fabric enclosure, and including a zipper closure disposed in an upper panel of said fabric enclosure.

27. An electric propulsion system for a bicycle, including:
   an electric motor having an output shaft joined to a drive roller;
   motor mounting means for pivotally securing said electric motor to a frame portion of the bicycle;
   wherein a torque of said motor creates a reaction force to cause impingement of said drive roller on the tire, and wherein when the drive roller impinges on the tire, the torque of said motor further urges said drive roller into greater frictional engagement with the tire.

28. The bicycle propulsion system of claim 27, wherein said motor mounting means includes a pair of mounting brackets secured to opposed ends of a steerer tube of the bicycle and including portions extending forwardly therefrom, and further including a first support extending in length-adjustable fashion between said pair of mounting brackets.

29. The bicycle propulsion system of claim 28, including a lateral pivot shaft, means for supporting said lateral pivot shaft on said first support, and a pair of pivot arms secured at opposed upper ends to said lateral pivot shaft, each of said pivot arms being secured at lower end to a first lateral support rod, a first end of said first lateral support rod secured to said electric motor.

30. The bicycle propulsion system of claim 29, further including a support plate secured to a second end of said first lateral support rod.

31. The bicycle propulsion system of claim 30, further including a main brace having opposed first and second ends and extending laterally between said motor and said support plate, said main brace secured at said first end to said electric motor and said support plate, and further including means for adjustably securing said second end of said main brace to said pivot arms.

32. The bicycle propulsion system of claim 30, wherein said support plate includes means for supporting a distal end portion of the output shaft of said electric motor.

33. The bicycle propulsion system of claim 32, wherein said means for supporting a distal end portion of the output shaft includes a bearing journal secured to said support plate, a bearing secured to said distal end portion of the output shaft, and a resilient bushing interposed between said bearing journal and said bearing to permit movement of the axis of said output shaft.

34. A control system for operating two electric motors selectively in series, parallel, or individually, including:
   first, second, and third relays having first, second, and third normally open relay contacts;

a power circuit comprising said first, second, and third normally open contacts connected in series between an electrical supply and ground;

a first one of said motors connected between said electrical supply and a circuit point between said second and third relay contacts;

a second one of said motors connected between ground and a circuit point between said first and second relay contacts;

selector switch means for operating said second relay to cause said second relay contacts to connect said first and second motors in electrical series, and for operating said first and third relays simultaneously to cause said first and third relay contacts to connect said first and second motors in parallel relationship; and means for operating said first and third relays alternately to cause said first and third relay contacts to close alternately and connect said second and first motors, respectively, to operate alternately.

35. The control system for operating two electric motors of claim 34, wherein said means for operating said first and third relays alternately includes a timer module for emitting a periodic timer signal, switching means for receiving said timer signal and switching on said third relay, and inverter means for receiving said timer signal and switching on said first relay when said timer signal turns off.

36. An electric propulsion system for a bicycle, including:

a pair of electric motors having output shafts joined to a common drive roller, the output shafts being rigidly secured together for rotation in common; and motor mounting means for mounting the pair of electric motors to a frame portion of the bicycle;

wherein a torque of the motors creates a reaction force to cause impingement of the drive roller on the tire, and wherein when the drive roller impinges on the tire, the torque of the motors further urges the drive roller into greater frictional engagement with the tire.

37. The bicycle propulsion system of claim 36, wherein the output shafts are rigidly secured in coaxial, confronting relationship.

38. The bicycle propulsion system of claim 36, wherein each of the pair of electric motors includes accommodating means for accommodating a misalignment between the output shafts.

39. The bicycle propulsion system of claim 38, wherein the accommodating means includes an elastomeric member provided adjacent the output shaft.

40. An electric propulsion system for a bicycle, including:

a pair of electric motors having output shafts joined to a common drive roller, each of the pair of electric motors including means for accommodating a misalignment between the output shafts; and motor mounting means for mounting the electric motors to a frame portion of the bicycle;

wherein a torque of the motors creates a reaction force to cause impingement of the drive roller on the tire, and wherein when the drive roller impinges on the tire, the torque of the motors further urges the drive roller into greater frictional engagement with the tire.

41. The bicycle propulsion system of claim 40, wherein the output shafts are rigidly secured in coaxial, confronting relationship.

42. The bicycle propulsion system of claim 40, wherein each of the pair of electric motors includes accommodating means for accommodating a misalignment between the output shafts.

43. The bicycle propulsion system of claim 42, wherein the accommodating means includes an elastomeric member provided adjacent the output shaft.

44. An electric propulsion system for a bicycle, including:

at least one electric motor having an output shaft joined to a drive roller;

motor mounting means for mounting the at least one electric motor to a frame portion of the bicycle; and a support plate secured to the motor mounting means for supporting a distal end portion of the output shaft of the at least one electric motor, the support plate including means for permitting movement of the axis of the output shaft with respect to the support plate;

wherein a torque of the at least one motor creates a reaction force to cause impingement of the drive roller on the tire, and wherein when the drive roller impinges on the tire, the torque of the at least one motor further urges the drive roller into greater frictional engagement with the tire.

45. The bicycle propulsion system of claim 44, wherein the means for permitting movement of the axis of the output shaft with respect to the support plate includes an elastomeric member provided adjacent the distal end portion of the output shaft.

46. An electric propulsion system for a bicycle, including:

at least one electric motor having an output shaft joined to a drive roller; and motor mounting means for pivotally mounting the at least one electric motor to a frame portion of a bicycle, the motor mounting means including a damped torsional spring for applying a damped resilient restoring force to the at least one electric motor to urge the drive roller toward engagement with a tire of the bicycle;

wherein a torque of the at least one motor creates a reaction force to cause impingement of the drive roller on the tire, and wherein when the drive roller impinges on the tire, the torque of the at least one motor further urges the drive roller into greater frictional engagement with the tire.

47. The bicycle propulsion system of claim 46, wherein the damped torsional spring includes an elastomeric member.

48. An electric propulsion system for a bicycle, including:

a pair of electric motors having output shafts joined to a common drive roller;

motor mounting means for mounting the pair of electric motors to a frame portion of the bicycle; and control means for actuating the pair of electric motors individually and alternately each for a predetermined period of time;

wherein a torque of the motors creates a reaction force to cause impingement of the drive roller on the tire, and wherein when the drive roller impinges on the tire, the torque of the motors further urges the drive roller into greater frictional engagement with the tire.

49. The bicycle propulsion system of claim 48, wherein the control means includes means for actuating the pair of electric motors selectively in electrical parallel connection and electrical series connection.

50. An electric propulsion system for a bicycle, including:

at least one electric motor having an output shaft joined to a drive roller;

motor mounting means for mounting the at least one electric motor to a frame portion of the bicycle; and suspension means for suspending a power source for the at least one electric motor under tension between a crossbar, a seat tube, and a down tube of the bicycle;

wherein a torque of the at least one motor creates a reaction force to cause impingement of the drive roller on the tire, and wherein when the drive roller impinges on the tire, the torque of the at least one motor further urges the drive roller into greater frictional engagement with the tire.

51. The bicycle propulsion system of claim 50, wherein the power source is suspended such that the weight of the power source is centered with respect to front and rear wheels of the bicycle.

52. The bicycle propulsion system of claim 50, wherein the suspension means includes at least two flexible straps.

53. The bicycle propulsion system of claim 52, wherein one of the at least two flexible straps extends between the seat tube and the down tube of the bicycle and another of the at least two flexible straps attaches to the crossbar of the bicycle.

* * * * *

(12) EX PARTE REEXAMINATION CERTIFICATE (5162nd)
United States Patent
McGreen

(10) Number: US 5,491,390 C1
(45) Certificate Issued: Jul. 26, 2005

(54) ELECTRIC PROPULSION SYSTEM FOR A BICYCLE

(75) Inventor: James R. McGreen, Alameda, CA (US)

(73) Assignee: Zap Power Systems, Sebastopol, CA (US)

Reexamination Request:
No. 90/005,356, May 11, 1999

Reexamination Certificate for:
Patent No.: 5,491,390
Issued: Feb. 13, 1996
Appl. No.: 08/181,780
Filed: Jan. 18, 1994

(51) Int. Cl.⁷ .................................................. B62D 3/00
(52) U.S. Cl. ............................ 318/5; 318/45; 180/221
(58) Field of Search .................. 224/439; 180/220–224, 180/65.2, 200, 201; 318/5, 45, 49, 83, 111–113, 432, 434

(56) References Cited

U.S. PATENT DOCUMENTS

| | | | |
|---|---|---|---|
| 3,431,994 A | * 3/1969 | Wood, Jr. | 180/220 |
| 3,878,910 A | * 4/1975 | Walker, Jr. | 180/220 |
| 4,062,421 A | * 12/1977 | Weber | 180/205 |
| 4,081,048 A | * 3/1978 | Hendricks | 180/205 |
| 4,386,675 A | * 6/1983 | Landon | 180/221 |
| 4,637,534 A | * 1/1987 | Leppek | 224/439 |
| 4,720,027 A | * 1/1988 | Board | 224/439 |
| 5,799,747 A | * 9/1998 | Olsen | 180/221 |

* cited by examiner

Primary Examiner—David Martin

(57) ABSTRACT

An electric propulsion system for a bicycle includes one or two electric motors secured to a mounting assembly attached to the bicycle, a drive roller that impinges on the front wheel of the bike, a battery pack secured to the frame of the bicycle, and a motor controller device operated by the bicycle rider. The mounting assembly is secured to the bicycle steerer tube and includes a laterally extending pivot shaft that is generally parallel to the axle of the adjacent front wheel. A pair of pivot arms are secured to opposed ends of the pivot shaft. A pair of electric motors are disposed face-to-face with their shafts in coaxial alignment and joined by a drive roller. Lower ends of the pivot arms are secured to respective electric motors. A main brace extends between the motors and includes an upper end adjustably secured to the pivot arms, and the lower end is also joined the electric motors. A spring is interposed between the pivot shaft and its support to impart a restoring force and damping effect to the pivot arms and the motors. Frictional engagement of the drive roller on the front tire is automatically increased by torque generated by the drive roller engaging the front wheel. A battery pack is secured to the front crossbar of the bicycle, and is connected through switches and a control system to the motors. The motors may be connected to the battery in series or parallel, or one at a time, and a timer in the control circuit switches from one motor to the other to prevent motor overheating. A three position selector switch is provided on the handlebar to control the relays and select the power output combination of the motors, and a momentary contact power switch is also secured to the handlebar to permit the rider to actuate the motors.

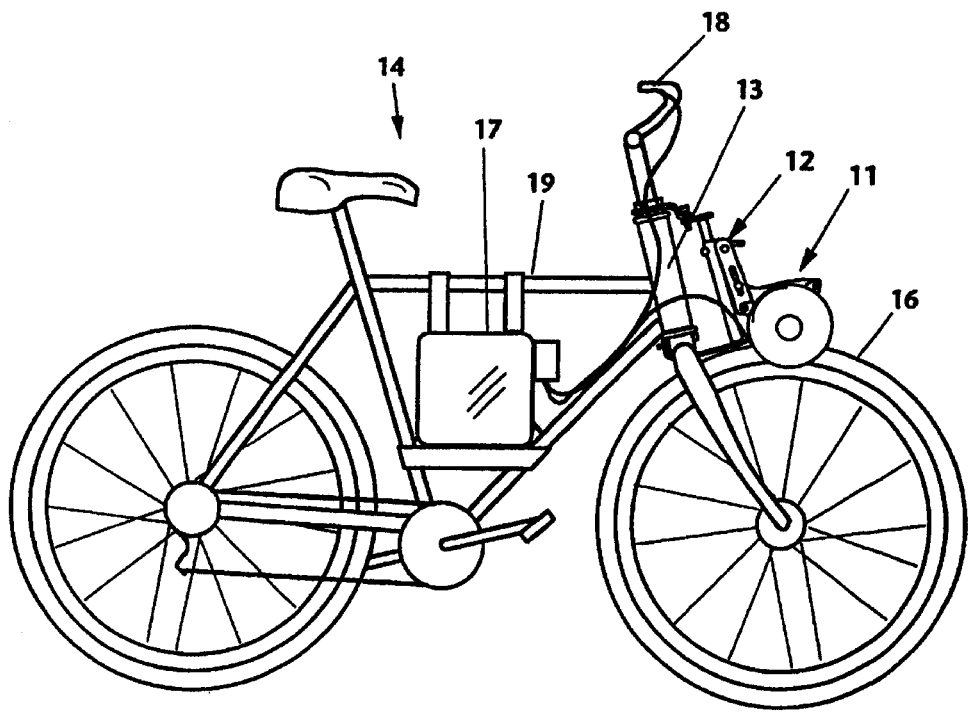

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–13, 15–18, 20, 21, 28–35, 45–47 and 49 is confirmed.

Claims 1–3, 14, 19, 22–27, 36–44, 48 and 50–53 are cancelled.

\* \* \* \* \*